(12) United States Patent
Steinman et al.

(10) Patent No.: US 7,699,042 B2
(45) Date of Patent: Apr. 20, 2010

(54) FILTRATION DEVICE FOR USE WITH A FUEL VAPOR RECOVERY SYSTEM

(75) Inventors: Robert J. Steinman, Lexington, OH (US); Jim Rockwell, Bellville, OH (US)

(73) Assignee: Stoneridge, Inc., Warren, OH (US)

( * ) Notice: Subject to any disclaimer, the term of this patent is extended or adjusted under 35 U.S.C. 154(b) by 56 days.

(21) Appl. No.: 12/039,095

(22) Filed: Feb. 28, 2008

(65) Prior Publication Data

US 2009/0025693 A1    Jan. 29, 2009

Related U.S. Application Data

(60) Provisional application No. 60/892,159, filed on Feb. 28, 2007.

(51) Int. Cl.
*F02M 37/20* (2006.01)
(52) U.S. Cl. .................................................. 123/516
(58) Field of Classification Search ................. 123/516, 123/518, 519, 520; 55/337, 385.3, 426, 439, 55/459
See application file for complete search history.

(56) References Cited

U.S. PATENT DOCUMENTS

| | | | |
|---|---|---|---|
| 2,983,384 A | 5/1961 | Winslow | |
| 3,834,126 A | 9/1974 | DiMinno | |
| 3,853,518 A | 12/1974 | Tu et al | |
| 4,058,380 A | 11/1977 | King, II | |
| 4,212,276 A | 7/1980 | Kaneda | |
| 4,338,106 A | 7/1982 | Mizuno et al. | |
| 4,486,206 A | 12/1984 | Miyakawa et al. | |
| 4,507,132 A | 3/1985 | Yoshida | |
| 4,750,923 A | 6/1988 | Haruta et al. | |
| 5,024,687 A | 6/1991 | Waller | |
| 5,047,072 A | 9/1991 | Wertz et al. | |
| 5,058,693 A | 10/1991 | Murdock | |
| 5,352,256 A | 10/1994 | Stead | |
| 5,478,379 A | 12/1995 | Bevins | |
| 5,501,198 A * | 3/1996 | Koyama ..................... 123/520 |
| 5,538,543 A | 7/1996 | Watanabe et al. | |
| 5,622,544 A | 4/1997 | Shamine et al. | |
| 5,638,786 A | 6/1997 | Gimby | |
| 5,641,344 A | 6/1997 | Takahashi et al. | |
| 5,725,639 A | 3/1998 | Khelifa et al. | |
| 5,762,692 A | 6/1998 | Dumas et al. | |
| 5,765,538 A | 6/1998 | Krimmer et al. | |
| 5,776,227 A | 7/1998 | Meiller et al. | |

(Continued)

OTHER PUBLICATIONS

International Search Report and Written Opinion dated Jul. 28, 2008 issued in related International Patent Application No. PCT/US2008055254.

*Primary Examiner*—Thomas N Moulis
(74) *Attorney, Agent, or Firm*—Grossman, Tucker, Perreault & Pfleger, PLLC

(57) ABSTRACT

A filtration device for filtering air for use with a fuel vapor recovery system. According to one aspect, the device includes a housing defining a chamber having a rotational axis an upper end and a lower end, a cap closes the housing and includes at least one generally helical passageway helically extending generally toward the lower end of the chamber and includes at least one air inlet. According to another aspect, the device includes a non-circular filter element disposed between an air inlet and an air outlet.

20 Claims, 7 Drawing Sheets

U.S. PATENT DOCUMENTS

| | | | |
|---|---|---|---|
| 5,840,104 A * | 11/1998 | Hashimoto et al. | 96/135 |
| 5,851,250 A | 12/1998 | Sugie et al. | |
| 5,878,728 A | 3/1999 | Kidokoro et al. | |
| 5,893,945 A | 4/1999 | Hunsinger et al. | |
| 5,910,637 A | 6/1999 | Meiller et al. | |
| 5,935,281 A | 8/1999 | Rotheiser et al. | |
| 6,042,628 A | 3/2000 | Nishikiori et al. | |
| 6,050,245 A * | 4/2000 | Cook et al. | 123/520 |
| 6,171,356 B1 | 1/2001 | Twerdun | |
| 6,228,151 B1 | 5/2001 | Conrad et al. | |
| 6,599,350 B1 | 7/2003 | Rockwell et al. | |
| 7,472,694 B2 * | 1/2009 | King | 123/518 |

* cited by examiner

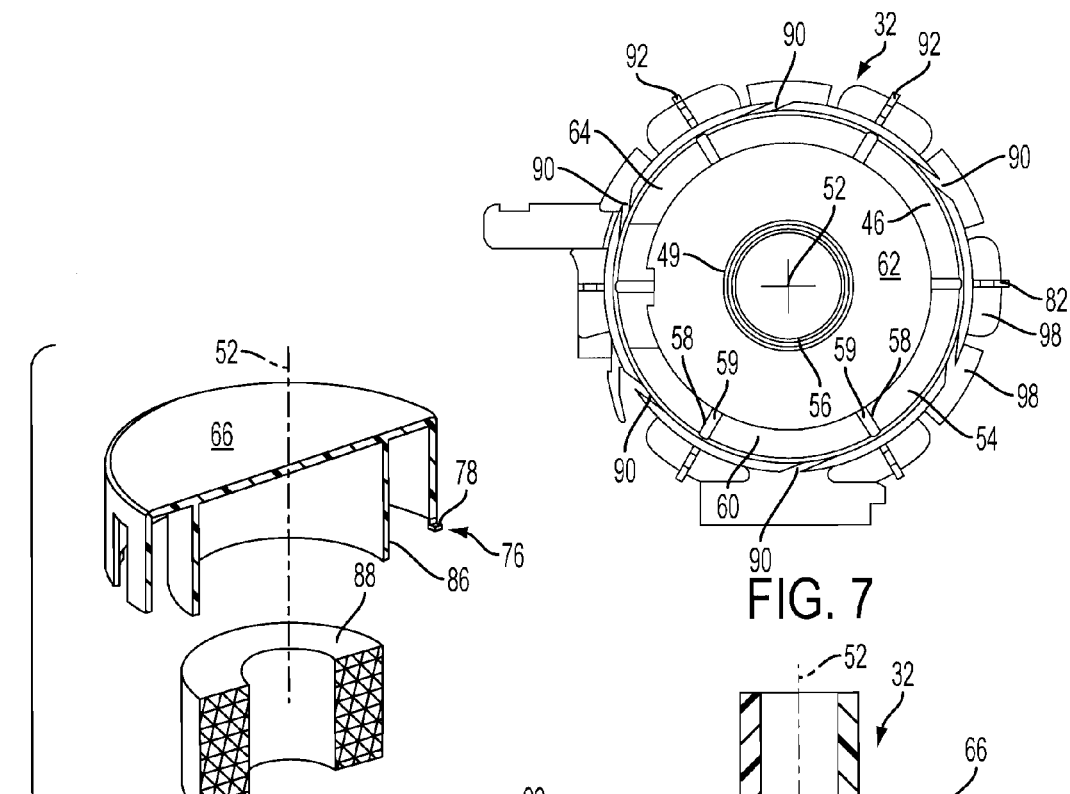
FIG. 7
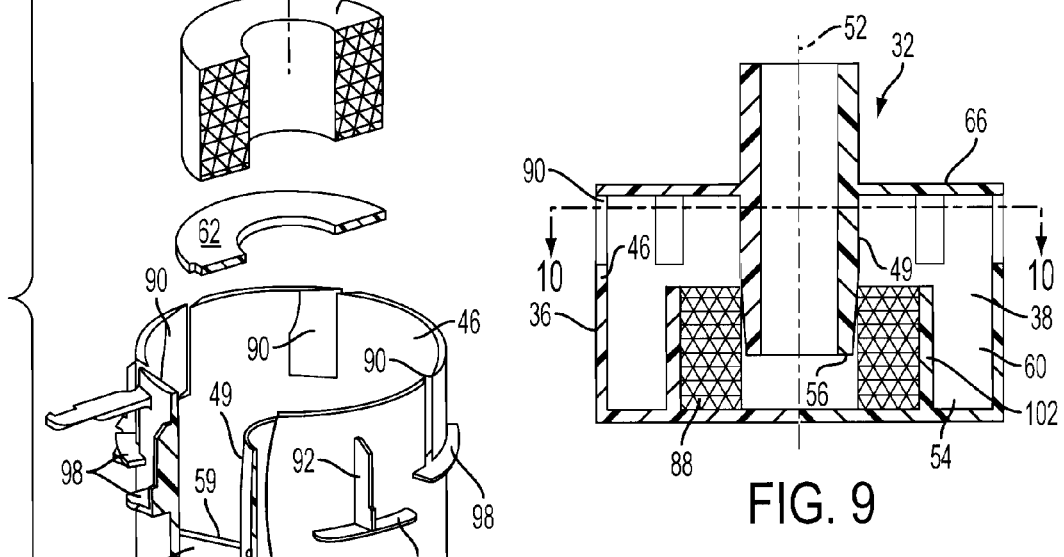
FIG. 8
FIG. 9
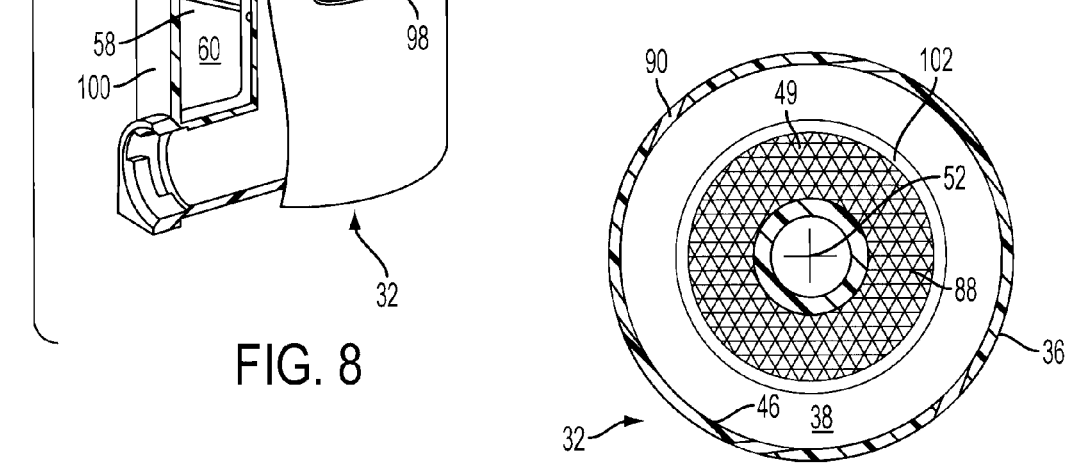
FIG. 10

FILTRATION DEVICE FOR USE WITH A FUEL VAPOR RECOVERY SYSTEM

CROSS-REFERENCE TO RELATED APPLICATIONS

This application claims the benefit of the filing date of U.S. Provisional Application Ser. No. 60/892,159, filed Feb. 28, 2007, the teachings of which are hereby incorporated herein by reference.

FIELD

The present disclosure relates generally to a filtration device used to remove contaminants, typically particulate matter or moisture from air used to purge a vapor canister. More specifically, the filtration device causes the air entering the device to flow along the inner circumference of a cylinder thereby generating an air stream having a sufficient flow velocity such that centrifugal force forces the contaminants against the side walls of the filter case whereafter they fall out of the air stream and collect in a low velocity cavity or dead air space.

BACKGROUND

Conventional motor vehicles, due to increased emission standards, typically include a fuel vapor recovery system. The fuel vapor recovery system includes a vapor or purge canister for receiving fuel vapors generated in the fuel tank. A fuel vapor absorbent, typically activated charcoal, located in the vapor canister retains the fuel vapor when the vapors are displaced from the fuel tank during refilling. During operation of the engine, the fuel vapor contained in the vapor canister is purged by drawing fresh air through the canister and into the intake manifold of the engine.

Some fuel vapor recovery systems include a filtration device to filter the fresh air introduced into the canister during the purge operation. Filters used in the past include a foam filter placed in a rectangular box. However, water tends to pass through the foam filter and into the canister which reduces the effectiveness of the absorbent or charcoal. Also, dust or other contaminants build up on the foam filter and clog the filter which further reduces its efficiency.

Thus, it is desirable to have a low cost, low maintenance filtration device that does not require a complex, self-cleaning apparatus to filter the fresh air supplied to the vapor recovery canister.

BRIEF DESCRIPTION OF THE DRAWINGS

Features and advantages of the present disclosure are set forth by the description of embodiments consistent therewith, which description should be considered in conjunction with the accompanying drawings, wherein:

FIG. 7 is a top view of the filtration device shown in FIG. 6 with portions removed for clarity.

FIG. 8 is an exploded, sectional, perspective view of the filtration device shown in FIG. 6.

FIG. 9 is a side sectional view of a fourth embodiment of a filtration device for use with a fuel vapor recovery system in accordance with the present disclosure.

FIG. 10 is a top, sectional view of the filtration device shown in FIG. 9 taken along lines 10-10.

DESCRIPTION

Figure 1:
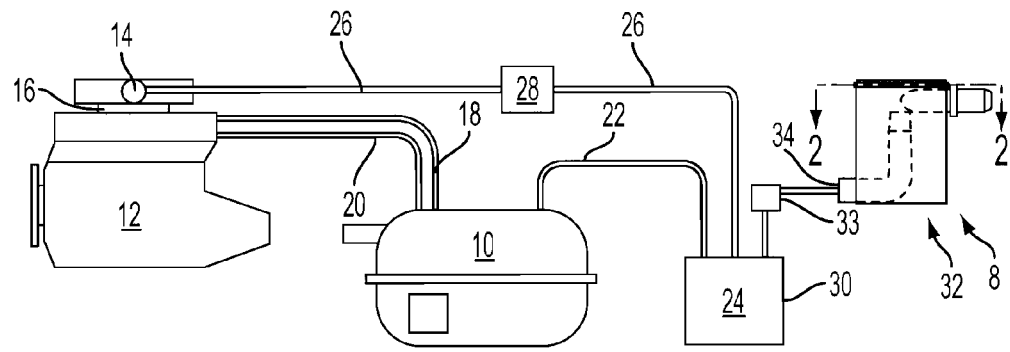
FIG. 1 is a schematic view of a vapor recovery system for use with an internal combustion engine utilizing a filtration device according to the present disclosure.

Referring now to the drawings, FIG. 1 schematically illustrates a filtration device, seen generally at 8, which may be used with a fuel vapor recovery system of the type used in an automotive vehicle. Automotive fuel systems typically include a fuel tank 10 that stores fuel for use with an engine 12. A throttle valve 14 adjacent an intake passage 16 may control the amount of intake air supplied to the engine 12. Fuel is supplied to the engine 12 from the fuel tank 10 through a fuel supply line 18 and unused fuel is returned to the fuel tank 10 through fuel return line 20. It should be appreciated by those skilled in the art that a fuel system having no fuel return line 20 may also be used.

During operation of the engine 12, at elevated temperature, and during refueling of the fuel tank 10, fuel vapors may be formed in the fuel tank 10. A typical vapor recovery system may include a fuel vapor vent line 22 used to vent fuel vapor from the fuel tank 10. Thus, when fuel enters the fuel tank 10 during the refueling operation, fuel vapor exiting the fuel tank 10 is directed through the fuel vapor vent line 22 to a vapor storage canister 24. The vapor storage canister 24 is filled with an absorbent material, typically activated charcoal that absorbs the fuel vapor.

Periodically, the fuel vapors may be purged to refresh the vapor storage canister 24. During the purging process, fuel vapor stored in the vapor storage canister 24 may be drawn through a purge line 26 into the intake passage 16. When the engine 12 is operating, the intake passage 16 operates at a negative pressure, thus the fuel vapors stored in the vapor storage canister 24 may be drawn into the intake passage 16. Flow from the vapor storage canister 24 to the intake passage 16 may be typically controlled by a solenoid valve 28. The solenoid valve 28 may be positioned in the purge line 26 and may be connected to and receives an operating signal from an engine control unit (not shown). In this way, the engine control unit may operate to control the amount of fuel and air supplied to the engine 12 to achieve the desired air/fuel ratio for efficient combustion.

In order to purge the vapor storage canister 24, fresh air may be drawn into the vapor storage canister 24 through a fresh air inlet 30 located on the vapor storage canister 24. Typically, a filter 32 may be placed on or adjacent the fresh air inlet 30 and may be used to filter the fresh air to remove any dirt, dust and water prior to the air being introduced into the vapor storage canister 24. Depending upon the location of the vapor storage canister 24 and the filter 32 on the vehicle, a fresh air line 34 may be used to transport the clean or filtered air to the vapor storage canister 24. It is evident that while the filter 32 is shown separated from the vapor storage canister 24, the filter 32 may be placed adjacent, connected to, or formed internal with the vapor storage canister 24, thus eliminating the need for a fresh air line 34. Some systems place the vapor storage canister 24 adjacent, connected to or internal with the fuel tank 10.

In many instances, a canister vent solenoid 33 may be used to close the fresh air line 34 during a system leak check. Typically, the filter 32 may be used with the canister vent solenoid 33. However, such use is not always necessary. Additionally, the canister vent solenoid 33 can be incorporated into the filter 32, typically when the filter 32 is formed as part of the vapor storage canister 24.

Figure 2:
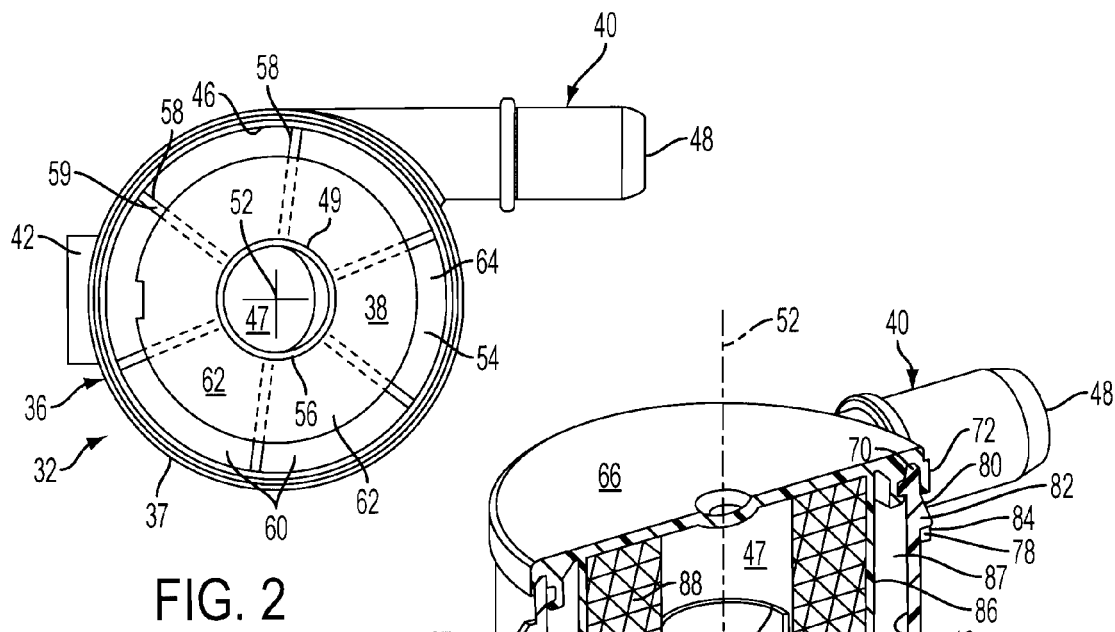
FIG. 2 is a top, sectional view of the filtration device shown in FIG. 1 taken along lines 2-2, with portions removed for clarity.
Figure 3:
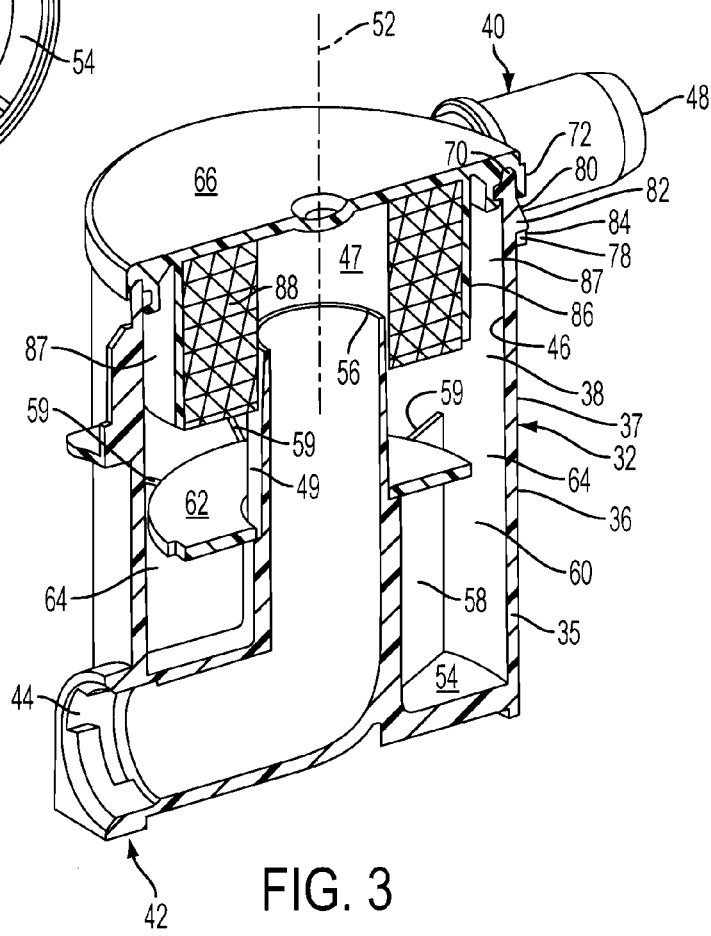
FIG. 3 is a sectional, perspective view of the filtration device for use with a fuel vapor recovery system in accordance with the present disclosure.
Figure 4:
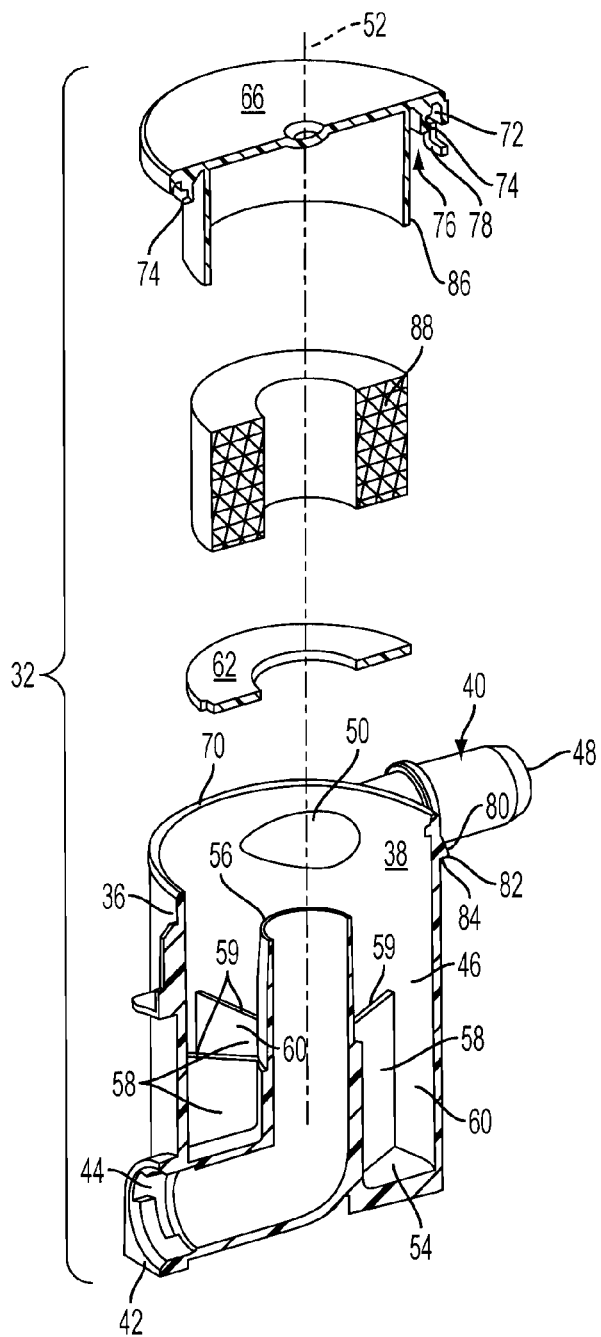
FIG. 4 is an exploded, sectional, perspective view of the filtration device shown in FIG. 3.

Turning now to FIGS. 2-4, a filter 32 according to one embodiment of the present disclosure is shown. The filter 32 may include a housing 36 having an outer surface 37. The housing 36 defines a chamber 38. When the filter 32 is formed as part of the vapor storage canister 24, the housing 36, instead of being a separate member as shown herein, may be an integral part of the overall configuration of the vapor storage canister 24. Thus, as used herein, the term "housing" means a structure that defines, in whole or in part, the chamber 38. It is apparent that any structure used to form the chamber 38 is the housing 36 as used herein.

The filter 32 may further include an inlet 40 and an outlet 42. The outlet 42 may be formed with a twist and lock style connector 44 to provide easy attachment to the fresh air line 34 or canister vent solenoid 33. It will be apparent that when positioned separate from the vapor storage canister 24, various types of attachment mechanisms may be used to connect the filter 32 to the fresh air inlet 30 of the vapor storage canister 24, including use of a nipple over which a hose may be clamped instead of the twist and lock style connector 44 shown herein. Further, a hose may also be attached to the inlet port 40 to vary the overall position of the air intake.

As shown in FIGS. 2-4, the chamber 38 may include a cylindrically-shaped interior surface 46. While shown herein as cylindrical, the chamber 38 and corresponding interior surface 46 thereof could be conical or some other combination of shapes designed to achieve a particular air flow pattern within the chamber 38. The function of the chamber 38 is to direct the air entering the chamber 38 through the inlet 40 in a particular flow pattern designed to force any particulate matter, moisture or other contaminants against the side walls or interior surface 46 of the chamber 38. This enables clean or filtered air to be removed from the interior or center 47 of the chamber 38 while the contaminants are forced outward, away from the outlet port 56.

The inlet 40 defines an inlet passage 48 that intersects with the interior surface 46 to define an inlet port 50. The inlet passage 48 may be positioned tangential to the cylindrical interior surface 46. FIG. 4 illustrates that such an arrangement results in an oblong or oval-shaped inlet port 50. The chamber 38 may also include a rotational axis 52 about which the air entering the chamber 38 rotates. As shown herein, the rotational axis 52 may coincide with the vertical or longitudinal axis of the chamber 38. Such an orientation is not always required. Depending upon the desired flow pattern, the axis of rotation 52 may be oriented in any number of positions. When the axis of rotation 52 coincides with the vertical or longitudinal axis of the chamber 38, and the inlet passage 48 is positioned substantially perpendicular to the longitudinal axis, no vertical or downward component of force is delivered to the chamber 38 by air entering the chamber 38 through the inlet passage 48.

In accordance with a further aspect of the present disclosure, the inlet passage 48 may be positioned at an angle with respect to the interior surface 46 to provide a change or variation in the vertical force or component of the air entering the chamber 38. In the present disclosure, as air enters the chamber 38 it rotates within the chamber 38 in a circular or cyclonic motion. The centrifugal force created by the air rotating within the chamber 38 forces the contaminants carried in the air stream against the interior surface 46. The contaminants, either by gravity or a secondary flow pattern producing a downward flow, are forced to a collection or lower portion 35 of the housing 36 where a low velocity cavity or dead airspace 54 exists. As shown, the low velocity cavity 54 may exist below the outlet port 56 of the outlet passage 49. Pursuant to the present disclosure, the contaminants fall out of the circular or cyclonic air stream and may collect in the collection portion 35 of the chamber 38. The clean or filtered air may then drawn out of the chamber 38 through the outlet port 56 located at or near the axis of rotation 52 of the chamber 38, i.e., along the vertical or longitudinal axis. The outlet port 56 is not required to be positioned coincident or at the axis of rotation 52 of the chamber 38. Ultimately, it may be spaced from the axis of rotation, depending upon the flow pattern of the air in the chamber 38.

As set forth above, the housing 36 may include a collection portion 35 formed by a low velocity cavity or dead air space 54 that collects the contaminants as they are removed from the air stream. The collection portion 35 may include a plurality of vertical side walls 58 that divide the collection portion 35 into a plurality of bins 60 into which the contaminants are collected. The purpose of the vertical side walls 58 shown herein is to stop the circular or cyclonic flow of the air within the chamber 38 to create the dead air space 54 in the collection portion 35. It should be evident that any other type of baffle system or arrangement that creates a dead air space in the collection portion 35 is also within the scope of the present disclosure. For instance, the side walls 58 do not need to be continuous, nor do they need to be vertical.

A lid 62 may be placed on the upper surface or edge 59 of the side walls 58. As shown, the lid 62 does not extend all the way to the interior surface 46 of the chamber 38. The purpose of the lid 62 is to contain the contaminants within the bins 60 while allowing entry of the contaminants into the bins 60. Accordingly, the lid 62 may be sized such that it leaves a gap 64 between the interior surface 46 of the chamber 38 and the lid 62 through which the contaminants travel.

Conversely, the lid 62 may extend all the way to the arcuate interior surface 46 if the lid 62 includes openings or holes therein to allow communication between the collection portion 35 of the housing 36 and the chamber 38, for the purpose of allowing the contaminants removed from the air stream to be trapped in the bins 60. Pursuant to the present disclosure, various types of openings such as slots, grooves, ducts or other passages that direct the contaminants into the collection portion 35 are also suitable. It should be appreciated that the purpose of the lid 62 is to trap contaminants within the bins 60, thus, any structure that performs such a function is within the scope of the present disclosure.

Figure 5:
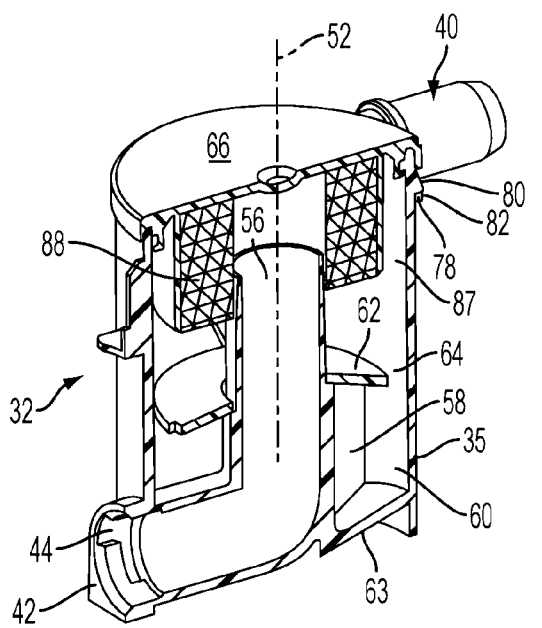
FIG. 5 is a sectional, perspective view of a second embodiment of a filtration device for use with a fuel vapor recovery system in accordance with the present disclosure.

It should be appreciated that as shown in FIG. 5, the bins 60 may have a conical bottom 63 that may be tapered inwardly toward the rotational axis 52 which, as shown herein, coincides with the vertical or longitudinal axis of the chamber 38. Tapering the collection portion 35 of the chamber 38 in this manner moves the collected contaminants toward the vertical or longitudinal axis of the chamber 38, either through gravity or vibration forces when the vehicle is operating, and under the lid 62. Further, as shown in FIG. 5, the lid 62 may also be formed in a conical shape to further direct any contaminants toward the gap 64 between the lid 62 and the interior surface 46 of the chamber 38.

The filter 32 may further include a cap 66 that attaches to the top 68 of the housing 36. As shown in FIG. 2, the cap 66 includes a groove 72 and a lip 74. The upper edge 70 of the housing 36 may be disposed within the groove 72 wherein the lip 74 engages the interior surface 46 of the chamber 38 to provide a seal between the cap 66 and the housing 36. The cap 66 may be held in place by a detent mechanism 76 having a finger 78. During installation of the cap 66 on the housing 36, the finger 78 is urged outwardly by a ramp surface 80 of a locking projection 82. When the cap 66 is fully installed on the housing 36, the finger 78 travels past the ramp surface 80 and snaps into place underneath a shelf or locking surface 84 of the locking projection 82. Another way of attaching the cap 66 to the housing 36 is to use sonic welding or spin welding. In keeping with the present disclosure, there are other options known to individuals skilled in the art for attaching, securing and sealing the cap 66 to the housing 36.

In keeping with the present disclosure, the cap 66 may further include a barrier wall 86 that extends from the cap 66 inwardly into the chamber 38. The barrier wall 86 may cooperate with the interior surface 46 of the chamber 38 to form a toroidal shaped region 87 in the chamber 38 that encourages an initial circular or cyclonic pattern of the air entering the chamber 38 through the inlet port 50. Additionally, the barrier wall 86 may help to force the air downward toward the collection portion 35 formed by the low velocity cavity or dead air space 54 as the air flows around the barrier wall 86.

Figure 11:
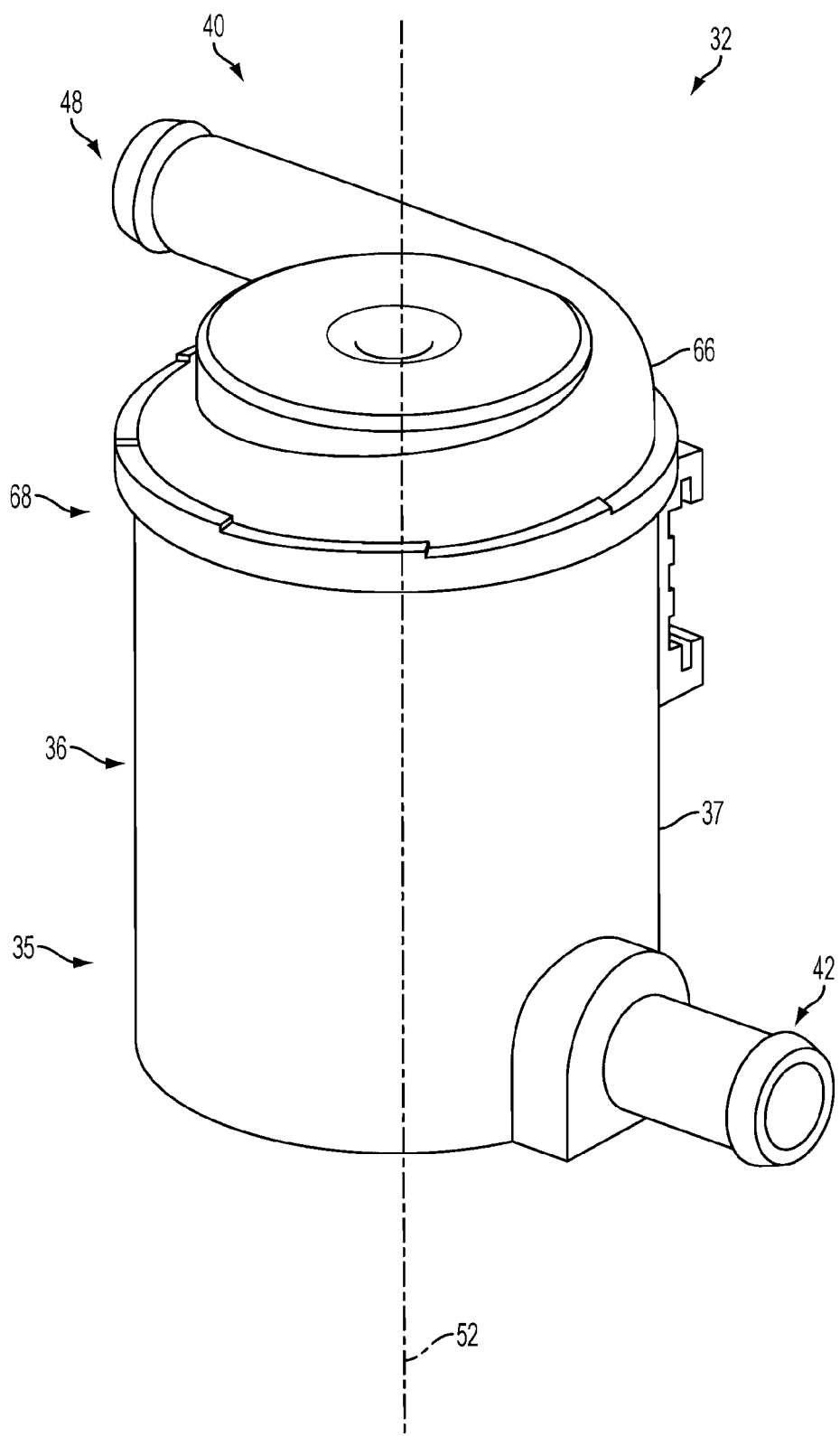
FIG. 11 is a side perspective view of another embodiment of the filtration device according to the present disclosure.
Figure 12:
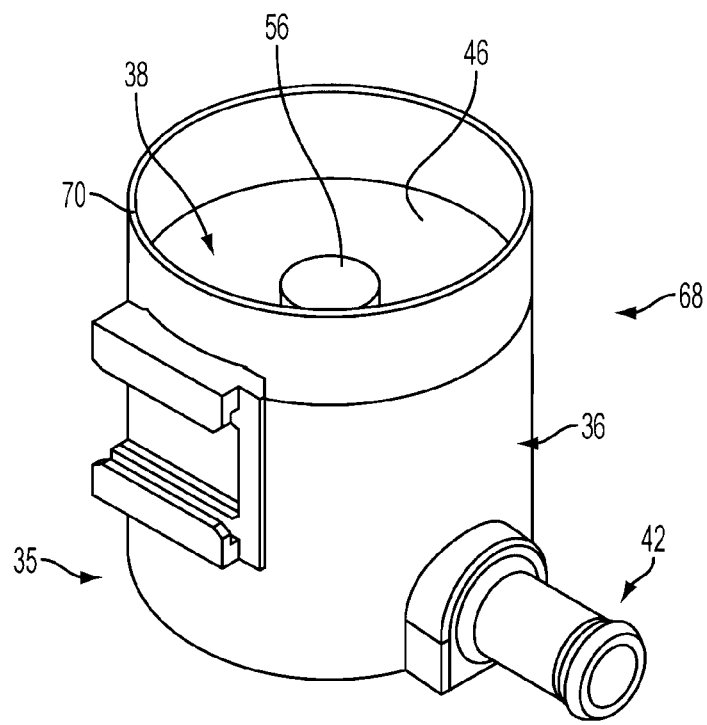
FIG. 12 is a perspective view of housing portion of the embodiment of the filtration device illustrated in FIG. 11.
Figure 13:
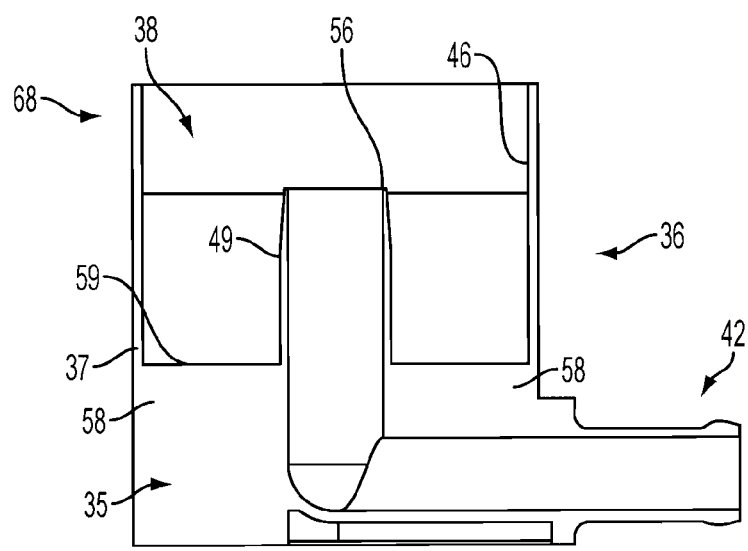
FIG. 13 is a sectional view of the housing portion illustrated in FIG. 11 taken through a centerline of an air outlet portion thereof.

According to another embodiment, the filter 32, FIG. 11, may feature a cap 66 including an air inlet port 40 formed as an integral component of the cap 66 rather than part of the housing 36. In such an embodiment, the housing 36 of the filter need not include the air inlet port 40, but may otherwise be substantially similar to the other housing embodiments described herein, as shown in FIGS. 12 and 13.

Figure 15:
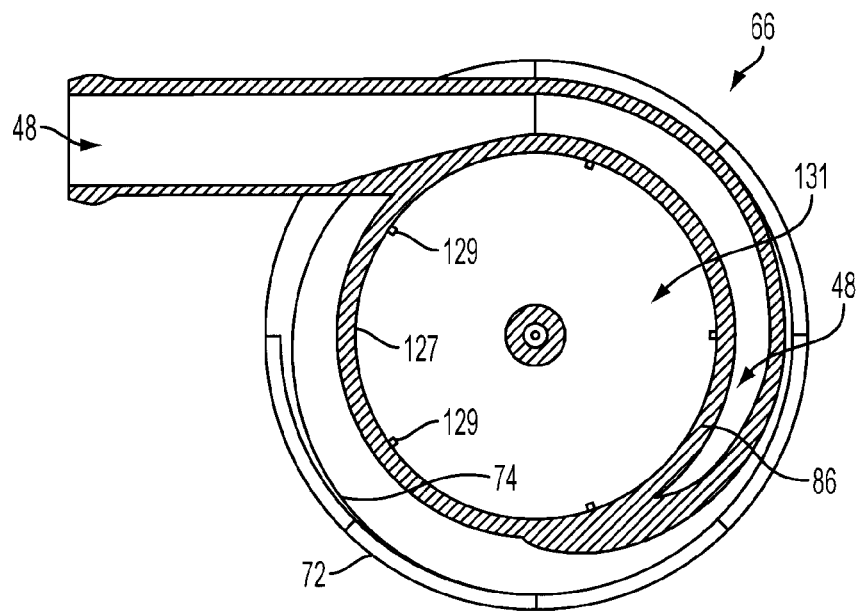
FIG. 15 is a sectional view of the cap portion illustrated in FIG. 11 taken through a centerline of an air inlet portion thereof.

As shown in FIG. 11, the cap 66 may be mounted, attached, fixed, or otherwise secured to the housing 36 of the filter 32 in any manner described herein. According to one embodiment, the cap 66 may include one or more mounting mechanisms (such as the detent mechanisms described above, threaded regions, or the like) that cooperate with a corresponding mounting mechanism on the housing 36 to retain the cap 66 relative to the housing 36. For example, as shown in FIG. 15, the cap 66 may include a groove 72 and a lip 74. The upper edge 70 of the housing 36 may be disposed within the groove 72 wherein the lip 74 engages the interior surface 46 of the chamber 38 to provide a seal between the cap 66 and the housing 36. The cap 66 may also be sonically welded, spin welded, or formed as a unitary component with the housing 36. Those skilled in the art will recognize that a variety of options exist for mounting, attaching, fixing, sealing, or otherwise securing the cap 66 to the housing 36.

The air inlet 40 may define an inlet passage 48 that intersects with the interior surface of the cap 66 to define an inlet port (not shown). The inlet passage 48 and inlet port may be positioned tangential to the cylindrical interior surface 46 of the cap 66 and/or the housing 36 or may be positioned at an angle with respect to the interior surface 46 to provide a change or variation in the vertical force or component of the air entering the chamber 38 in a manner substantially consistent with the embodiments described above.

Figure 14:
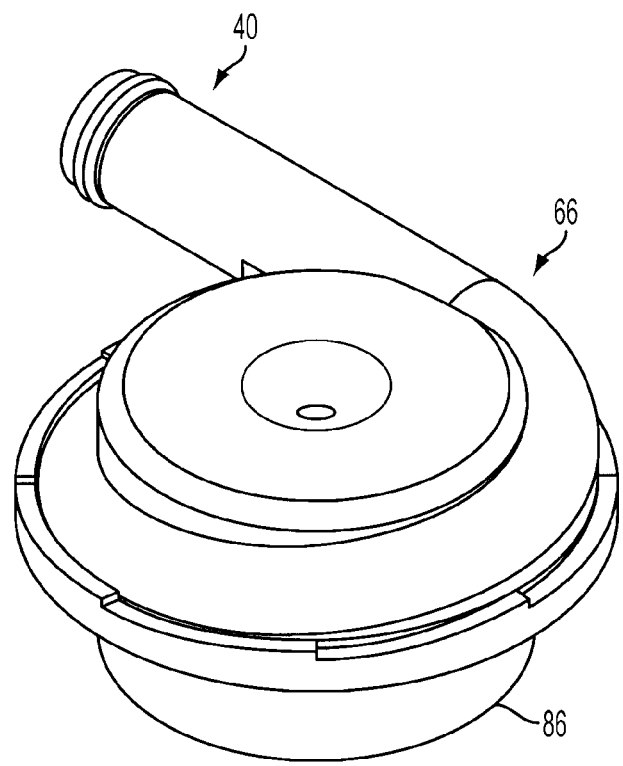
FIG. 14 is a perspective view of cap portion of the embodiment of the filtration device illustrated in FIG. 11.

According to a further aspect, as shown particularly in FIGS. 14-15, the cap 66 may optionally include a helical or spiral shaped inlet passage 48. The helical or spiral shaped inlet passage 48 may facilitate the separation of debris entrapped in the incoming air by facilitating the creation of a helical-like, spiral-like or rotating airflow pattern within the filter 32 and increasing a centrifugal force urging the debris towards the interior surface 46 of the filter 32. Additionally, the helical-like, spiral-like or rotating airflow pattern created by the helical or spiral shaped inlet passage 48 facilitates the creation of a downward force component within the filter 32. This downward force component may facilitate urging the debris separated from the incoming air toward the collection cavity/portion 35 of the filter 32. As a result, the air flow through the filter 32 may be improved since more debris is collected in the collection cavity/portion 35 of the filter 32 and less debris is collected on the interior surface 46. As used herein, the term "downward force" is intended to mean a force in a generally direction toward an end 35 of the filter 32 generally opposite or away from the air inlet 40.

The filter 32 may also include a secondary filter element 88 such as a foam-style filter to provide additional filtration of any contaminants not removed by the centrifugal force of the air stream rotating in the chamber 38. While shown as a foam filter, the secondary filter element 88 may be made of paper or any other filter material that filters contaminants from the fluid. It is not necessary to use a secondary filter element 88. However, if one is used, it may be oriented such that during back flow any contaminants captured will be released from the secondary filter element 88 and fall onto the lid 62 and subsequently into the bins 60. Back flow results when the fuel tank 10 is filled and the fuel vapor is vented through the vapor storage canister 24 such that air is displaced from the vapor storage canister 24 outward through the filter 32.

The outlet passage 49 in FIG. 3 is shown extending downwardly and out the bottom of the housing 36. FIGS. 9 and 10 show the outlet passage 49 may also be oriented such that it extends outwardly through the cap 66. It is evident that the outlet passage 49 and ultimately outlet port 56 should be placed along the rotational axis 52 of the chamber 38 as the contaminants are forced outward away from the center of the chamber 38. Additionally, placing the outlet passage 49 as set forth above causes the least interference with the circular or cyclonic motion of the air stream formed in the chamber 38. In addition, should a secondary filter element 88 be used, it may be mounted within the outlet passage 49 or between the outlet port 56 and the lower end of the chamber 38. In operation, a receptacle or holder 102 may be secured to the lower portion of the chamber 38 to secure the secondary filter element 88. The secondary filter element 88 may be of a size less than that of the chamber 38 in order to create a low velocity cavity or collection portion 35 to collect the contaminants.

For example, the secondary filter element 88 may have a substantially circular or cylindrical shape as best shown in FIG. 10. The secondary filter element 88 may have an outer diameter substantially corresponding to the inner diameter of the barrier wall 86, and a central cylindrical opening therein for receiving at least a portion of the outlet passage 49.

Figure 16:
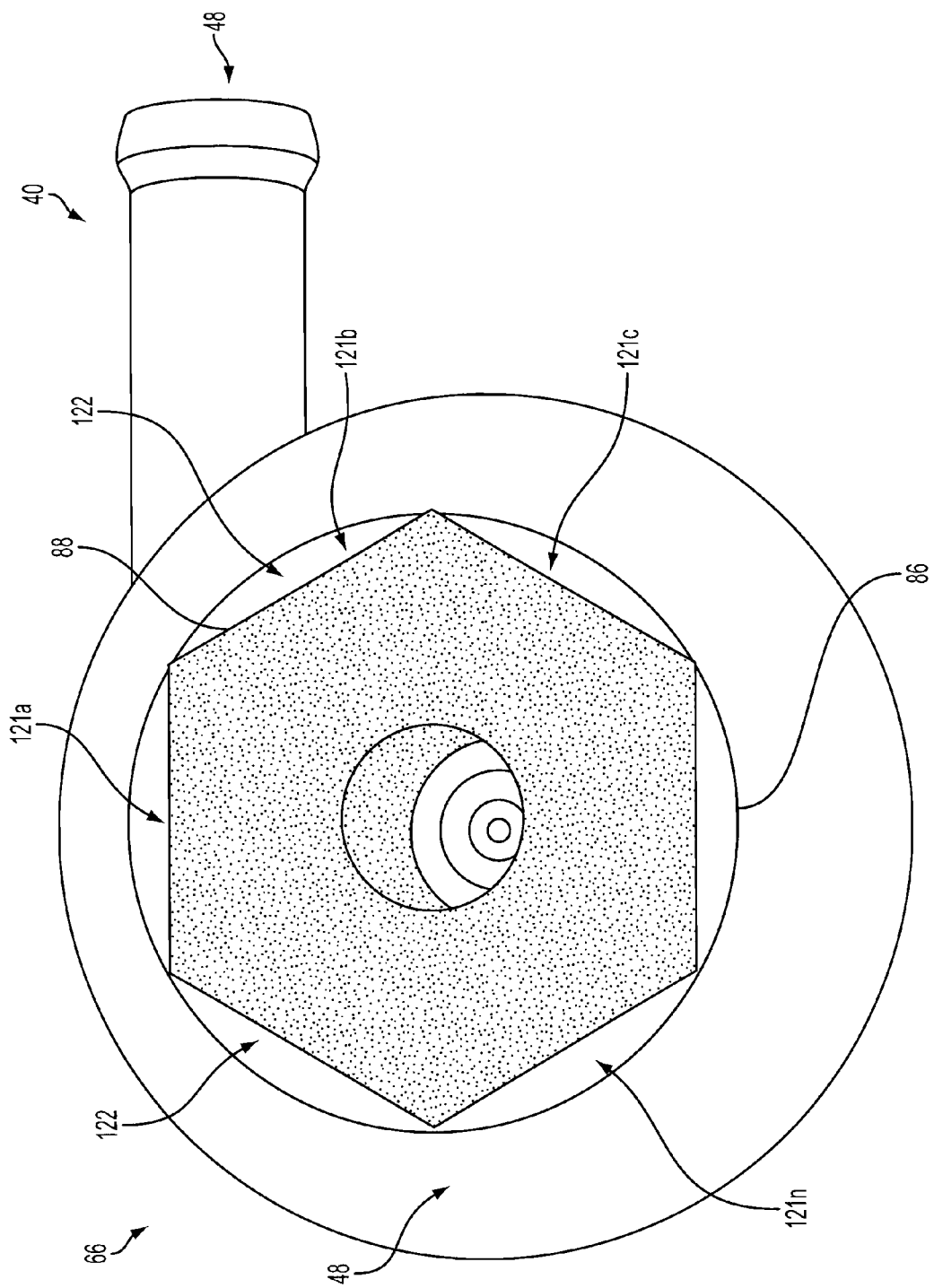
FIG. 16 is a bottom view of the cap portion illustrated in FIG. 11 including a non-circular filter element according to the present disclosure.

According to another embodiment, the secondary filter element 88, FIG. 16 may have a non-circular or non-cylindrical outer perimeter. For example, the secondary filter element 88 may feature a plurality of substantially flat sides 121a-121n. According to one embodiment, the filter element may have at least five flat sides. In the embodiment shown in FIG. 16, the filter element includes six flat sides to define a generally hexagonal perimeter.

The perimeter of the non-circular filter element 88 may be sized to provide sufficient interference with the interior surface 127 of the cylindrical barrier wall 86 to support the filter element 88 within the internal space 131 defined by the barrier wall 86. Additionally, while the barrier wall 86 is shown having a generally circular perimeter, the barrier wall 86 may also have a non-circular perimeter and/or may be made from one or more discrete segments or portions. In one embodiment, as shown in FIG. 15 a plurality of inwardly projecting barbs 129 may be provided on the interior surface 127 of the barrier wall for supporting the filter element. Alternatively (or in addition to the barrier wall), an adhesive or other securing mechanism (such as, but not limited to, one or more straps, over-molding, or the like) may be provided to support the filter element 88 within barrier wall. It should also be noted that the filter element 88 may be secured within the filter 32 without the use of the barrier wall, for example, using an adhesive or other securing mechanism.

Using a circular filter element that it tightly fit to the interior surface 127 of the barrier wall 86 allows air-flow through the bottom of the filter element. However, fitting a non-circular filter element into the circular interior surface 127 of the barrier wall allows air-flow gaps 122 between the interior surface of the barrier wall and the sides 121a-121n of the filter element. Air may, therefore, flow through the bottom of the filter element and through the sides of the filter element for filtering. The non-circular filter element 88 may thus increase the surface area available for filtering compared to a circular filter element that is tightly fit to the interior surface 127 of the barrier wall.

During use, a layer of debris may build up on the surface 121 of the filter element 88 and may form what is commonly referred to as a "cake" layer on the surface 121 of the filter element 88. This cake layer may reduce the ability of the air to flow through the filter element 88 and thus may increase the flow restriction of the filter element 88. By providing the filter element 88 with a non-circular perimeter, the overall surface area of the filter element 88 may be increased, thereby reducing the flow restrictions of the cake layer formed on the filter element 88 for a given quantity of debris.

The non-circular filter element 88 may also reduce the amount of wasted filter material (such as, but not limited to foam or the like) compared to a generally circular filter element 88. For example, in the embodiment wherein the non-circular filter element 88 has a generally hexagonal perimeter, the sides 121 of the non-circular filter element 88 may substantially fit tightly together (similar to a honeycomb structure). As a result, cutting hexagonal shaped filter elements 88 may reduce the amount of wasted material an increase the number of filter elements 88 for a given amount of filtering material.

In operation, atmospheric air containing contaminants such as particulate matter or moisture may be drawn into the chamber 38 of the filter 32 through the inlet passage 48. As the inlet passage 48 may be positioned tangential to the interior surface 46 of the chamber 38, air entering the chamber 38 may engage the interior surface 46 thereof and may be caused to move in a circular or cyclonic motion. Such circular or cyclonic motion may result in a centrifugal force that may force the contaminants against the interior surface 46, wherein they may then be forced, either by gravity or a secondary flow pattern producing a downward flow, toward the collection portion 35 of the chamber 38 formed by a low velocity cavity or dead airspace 54. Bins 60 collect the contaminants. The air stream may be urged inward toward the center of the chamber 38 as additional air continues to flow into the chamber 38. Filtered air may be removed through the outlet port 56. When used, the secondary filter element 88 may be positioned such that the air stream must pass through the secondary filter element 88 prior to being drawn out of the chamber 38 through the outlet port 56. Thus, clean, filtered air may be used during the purge process to purge the fuel vapors from the vapor storage canister 24.

Figure 6:
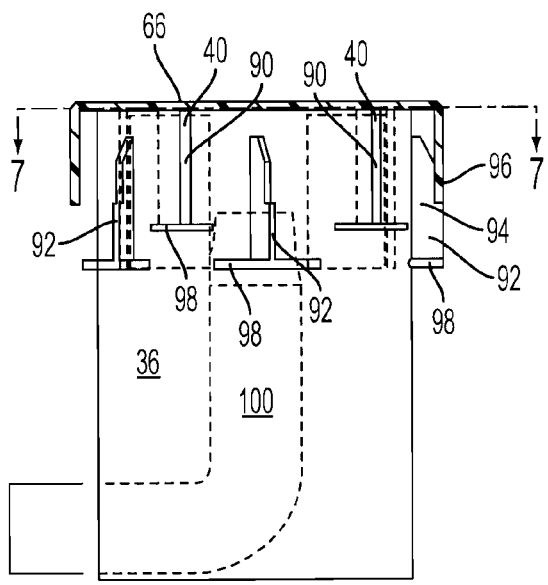
FIG. 6 is a side view of a third embodiment of a filtration device for use with a fuel vapor recovery system in accordance with the present disclosure with portions removed for clarity.

Shown in FIGS. 6-8 is an additional embodiment of the present disclosure wherein the inlet 40 is formed of a plurality of slots 90 cut into the housing 36. As shown in FIG. 7, the slots 90 are oriented tangential to the interior surface 46 of the chamber 38. As set forth in the previous embodiment, the air may enter into the chamber 38 in a direction substantially tangential to the interior surface 46 and may thus flow within the chamber 38 in a generally circular or cyclonic motion. The cap 66 may be supported on the housing 36 by a plurality of outwardly extending ribs 92. The ribs 92 act as spacers to provide a gap 94 between the downwardly extending flange portion 96 of the cap 66 and the housing 36. The detent mechanism 76 may be similar to that used in the previous embodiments and may include the finger 78 and the locking projection 82 to secure the cap 66 to the housing 36. A plurality of outwardly extending baffles 98 may be placed on the outer surface 100 of the housing 36. The baffles 98 may be staggered in their arrangement on the outer surface 100 of the housing 36 to provide a tortuous path for air entering the filter 32 through the gap 94 and ultimately through the slots 90 into the chamber 38. Providing a tortuous path helps to keep foreign matter such as mud, water, dust, debris and other pollutants from entering the filter during operation of the vehicle.

In operation, air may be drawn into the chamber 38 through the slots 90 in the housing 36. As the slots 90 extend in a direction tangential to the interior surface 46 of the chamber 38, the air, upon entering the chamber 38, may move in a generally circular or cyclonic motion which forces particulate matter, contaminants or moisture of sufficient mass against the interior surface 46 of the chamber 38 where gravity or a secondary flow pattern producing a downward flow forces them into the bin 60. Once again, the filtered air may be drawn out through an outlet port 56 and may be used to purge the vapor storage canister 24.

According to one aspect, the present disclosure features a filtration device for filtering air for use with a fuel vapor recovery system. The filtration device includes a housing defining a chamber having a rotational axis, an arcuate interior surface and an upper end and a lower end. A cap is configured to be positioned on and close the upper end of the housing. The cap defines at least one generally helical passageway helically extending generally toward the lower end of the chamber and including at least one air inlet, such that air entering the chamber through the air inlet is directed by the helical passageway to rotate in the chamber about the rotational axis wherein a centrifugal force of the rotating air filters out contaminants contained therein and a downward force of the air urges the contaminants towards the lower end. An air outlet is positioned within the chamber for removing filtered air from the filtration device.

According to another aspect of the disclosure, there is provided a filtration device for filtering air for use with a fuel vapor recovery system The filtration device includes a housing defining a chamber having a rotational axis an upper end and a lower end; at least one air inlet in communication with the chamber, such that air entering the chamber through the air inlet is directed to rotate in the chamber about the rotational axis wherein a centrifugal force of the rotating air filters out contaminants contained therein and a downward force of the air urges the contaminants towards the lower end; an air outlet positioned within the chamber for removing filtered air from the filtration device; and a secondary filter element disposed between the air inlet and the air outlet. The secondary filter element is supported in the device with an exterior surface thereof positioned adjacent a generally cylindrical wall surface. The secondary filter element includes a non-circular exterior perimeter whereby a plurality of air flow passages are defined between the exterior perimeter and the wall surface for allowing air to flow through the a plurality of sides of the filter element to the air outlet.

The present disclosure has been described in an illustrative manner. It is to be understood that the terminology which has been used is intended to be in the nature of words of description rather than of limitation. The features and aspects described with reference to particular embodiments disclosed herein may be susceptible to combination and/or application in various other embodiments described herein. Such combinations and/or applications of such described features and aspects to such other embodiments are contemplated herein. Additionally, the embodiments disclosed herein are susceptible to numerous variations and modifications without materially departing from the spirit of the disclosed subject matter. Accordingly, the present disclosure herein should not be considered to be limited to the particular embodiments disclosed herein.

What is claimed is:

1. A filtration device for filtering air for use with a fuel vapor recovery system, said filtration device comprising:
    a housing defining a chamber having a rotational axis an upper end and a lower end;
    a cap configured to be positioned on and close the upper end of the housing, said cap defining at least one generally helical passageway helically extending generally toward the lower end of the chamber and comprising at least one air inlet, such that air entering the chamber through the air inlet is directed by said helical passageway to rotate in the chamber about the rotational axis wherein a centrifugal force of the rotating air filters out contaminants contained therein and a downward force of the air urges the contaminants towards the lower end; and
    an air outlet positioned within the chamber for removing filtered air from the filtration device.

2. A filtration device according to claim 1, said device comprising a secondary filter element disposed between said air inlet and said air outlet, said secondary filter element supported in said device with an exterior surface thereof positioned adjacent a generally cylindrical wall surface, said secondary filter element comprising a non-circular exterior perimeter whereby a plurality of air flow passages are defined between said exterior perimeter and said wall surface for allowing air to flow through said a plurality of sides of said filter element to said air outlet.

3. A filtration device according to claim 2, wherein said wall surface comprises an interior surface of a cylindrical wall extending axially from said cap.

4. A filtration device according to claim 3, wherein said cylindrical wall comprises a barrier wall extending into said chamber and spaced from an arcuate interior surface of said housing such that a gap is formed between said barrier wall and said arcuate interior surface, said barrier wall extending into said chamber to a position past an outlet port of said air outlet wherein air entering said chamber must flow past an end of said barrier wall prior to exiting said chamber through said outlet port.

5. A filtration device according to claim 2, wherein said filter element has a generally hexagonal exterior surface.

6. A filtration device according to claim 2, wherein said filter element has a central cylindrical opening therein for receiving at least a portion of an outlet port associated with said air outlet.

7. A filtration device as set forth in claim 1, wherein said air inlet is formed by at least one tubular portion of said cap.

8. A filtration device according to claim 1, wherein said cap comprises a barrier wall extending into said chamber and spaced from an arcuate interior surface of said housing such that a gap is formed between said barrier wall and said arcuate interior surface, said barrier wall extending into said chamber to a position past an outlet port of said air outlet wherein air entering said chamber must flow past an end of said barrier wall and then through a gap formed between said barrier wall and said outlet passage prior to exiting said chamber through said outlet port.

9. A filtration device as set forth in claim 1, wherein said chamber includes a collection portion including a low velocity cavity, said collection portion formed below an outlet port associated with said air outlet.

10. A filtration device as set forth in claim 9, wherein said collection portion is formed below said outlet port and contains at least one bin for receiving contaminants removed from the air entering the chamber.

11. A filtration device as set forth in claim 10 including a lid positioned on top of said bin, said lid being configured to allow contaminants to enter said bin.

12. A filtration device for filtering air for use with a fuel vapor recovery system, said filtration device comprising:
    a housing defining a chamber having a rotational axis an upper end and a lower end;
    at least one air inlet in communication with said chamber, such that air entering the chamber through the air inlet is directed to rotate in the chamber about the rotational axis wherein a centrifugal force of the rotating air filters out contaminants contained therein and a downward force of the air urges the contaminants towards the lower end;
    an air outlet positioned within the chamber for removing filtered air from the filtration device; and
    a secondary filter element disposed between said air inlet and said air outlet, said secondary filter element supported in said device with an exterior surface thereof positioned adjacent a generally cylindrical wall surface, said secondary filter element comprising a non-circular exterior perimeter whereby a plurality of air flow passages are defined between said exterior perimeter and said wall surface for allowing air to flow through said a plurality of sides of said filter element to said air outlet.

13. A filtration device as set forth in claim 12, said device further comprising a cap positioned on said upper end, wherein said wall surface comprises an interior surface of a cylindrical wall extending axially from said cap.

14. A filtration device according to claim 13, wherein said cylindrical wall comprises a barrier wall extending into said chamber and spaced from an arcuate interior surface of said housing such that a gap is formed between said barrier wall and said arcuate interior surface, said barrier wall extending into said chamber to a position past an outlet port of said air outlet wherein air entering said chamber must flow past an end of said barrier wall prior to exiting said chamber through said outlet port.

15. A filtration device as set forth in claim 13, wherein said air inlet is formed by at least one tubular portion of said cap.

16. A filtration device according to claim 12, wherein said filter element has a generally hexagonal exterior surface.

17. A filtration device according to claim 12, wherein said filter element has a central cylindrical opening therein for receiving at least a portion of an outlet port associated with said air outlet.

18. A filtration device as set forth in claim 12, wherein said chamber includes a collection portion including a low velocity cavity, said collection portion formed below an outlet port associated with said air outlet.

19. A filtration device as set forth in claim 18, wherein said collection portion is formed below said outlet port and contains at least one bin for receiving contaminants removed from the air entering the chamber.

20. A filtration device as set forth in claim 18 including a lid positioned on top of said bin, said lid being configured to allow contaminants to enter said bin.

* * * * *